United States Patent
Barton et al.

(10) Patent No.: US 6,739,578 B2
(45) Date of Patent: May 25, 2004

(54) COUPLING MECHANISM AND VALVE SYSTEM FOR A PRESSURIZED FLUID CONTAINER

(75) Inventors: Russell H. Barton, New Westminster (CA); Kenneth W. Strang, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 212 days.

(21) Appl. No.: 09/918,355

(22) Filed: Jul. 30, 2001

(65) Prior Publication Data

US 2002/0100891 A1 Aug. 1, 2002

(30) Foreign Application Priority Data

Jan. 30, 2001 (CA) .............................. 2333241

(51) Int. Cl.⁷ .......................... F16K 51/00; F16L 29/00; F16L 37/28
(52) U.S. Cl. ....................... 251/149.9; 137/606; 439/20
(58) Field of Search .......................... 251/149.8, 149.9; 137/614.05, 606, 614.06; 439/15, 20, 22, 29

(56) References Cited

U.S. PATENT DOCUMENTS

| | | | | |
|---|---|---|---|---|
| 3,913,273 A | * | 10/1975 | Romanowicz, Jr. | .......... 451/77 |
| 4,202,309 A | * | 5/1980 | Burke | ...................... 123/179.8 |
| 4,793,379 A | | 12/1988 | Eidsmore | ............... 137/614.19 |
| 5,188,017 A | | 2/1993 | Grant et al. | ................... 91/459 |
| 6,360,914 B1 | * | 3/2002 | Frank et al. | .................... 222/3 |
| 2002/0094468 A1 | | 7/2002 | Miura et al. | ................... 429/34 |

* cited by examiner

*Primary Examiner*—Edward K. Look
*Assistant Examiner*—John K. Fristoe, Jr.
(74) *Attorney, Agent, or Firm*—McAndrews, Held & Malloy, Ltd.

(57) ABSTRACT

A quick connect fitting is provided for connecting a pressure fluid container to an intake port of a consumer system, such as a fuel cell stack. The fitting includes a solenoid-activated valve for controlling outflow of fluid from the pressure fluid container. The valve is biased to a closed position when no electrical power is supplied to the solenoid. In one embodiment the fitting incorporates a coupling mechanism for removable attachment to the intake part of the consumer system.

9 Claims, 9 Drawing Sheets

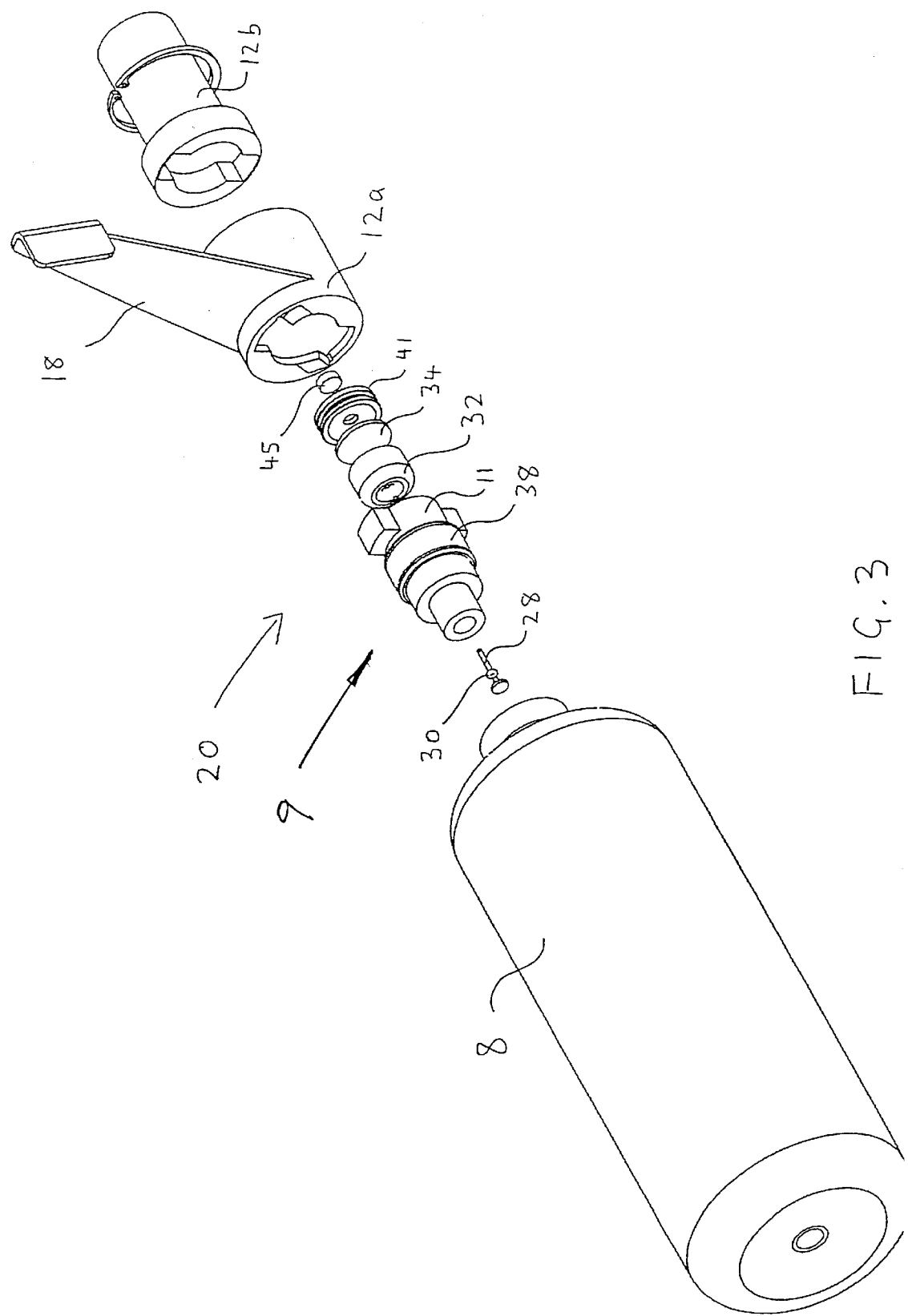

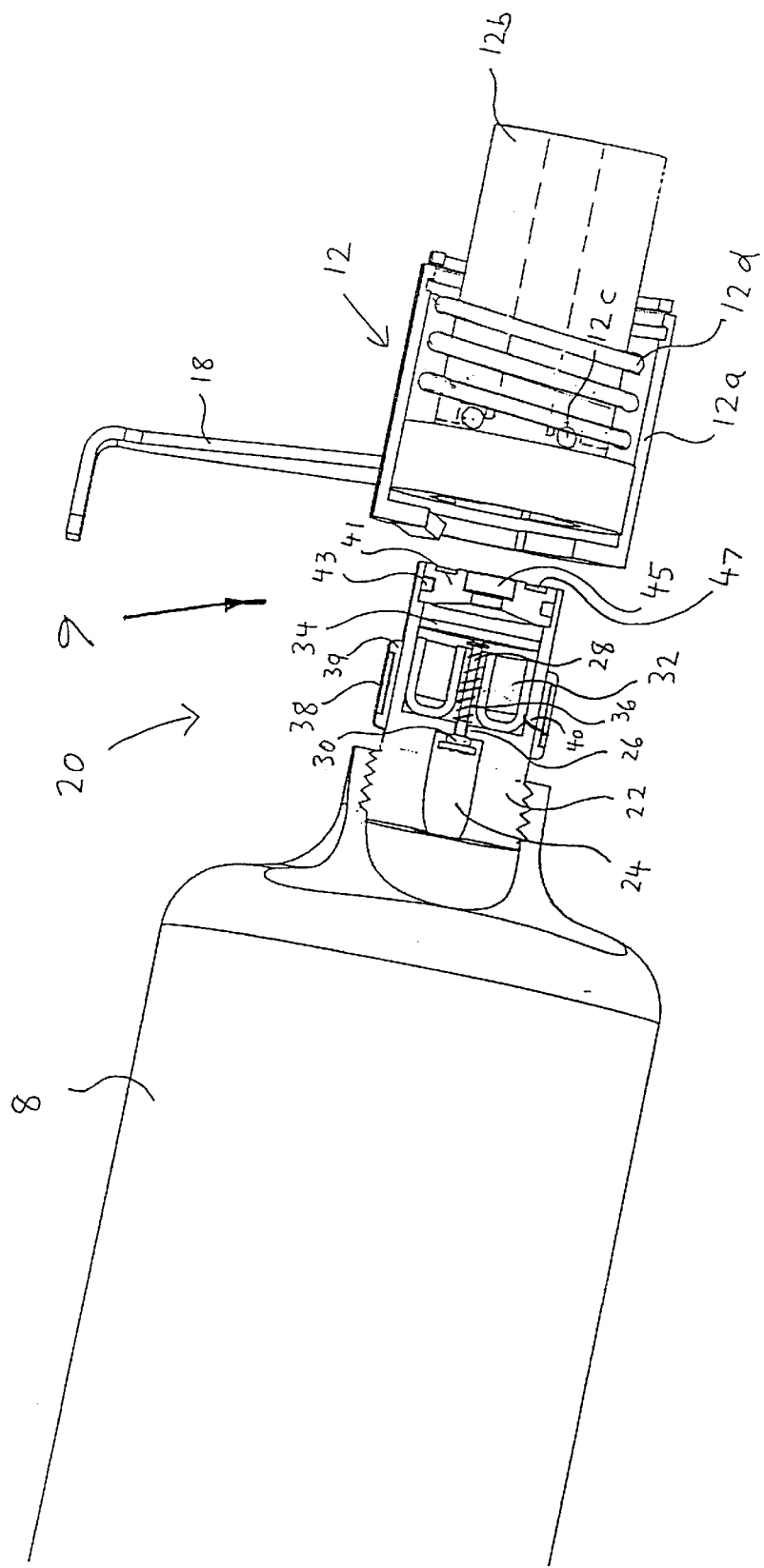

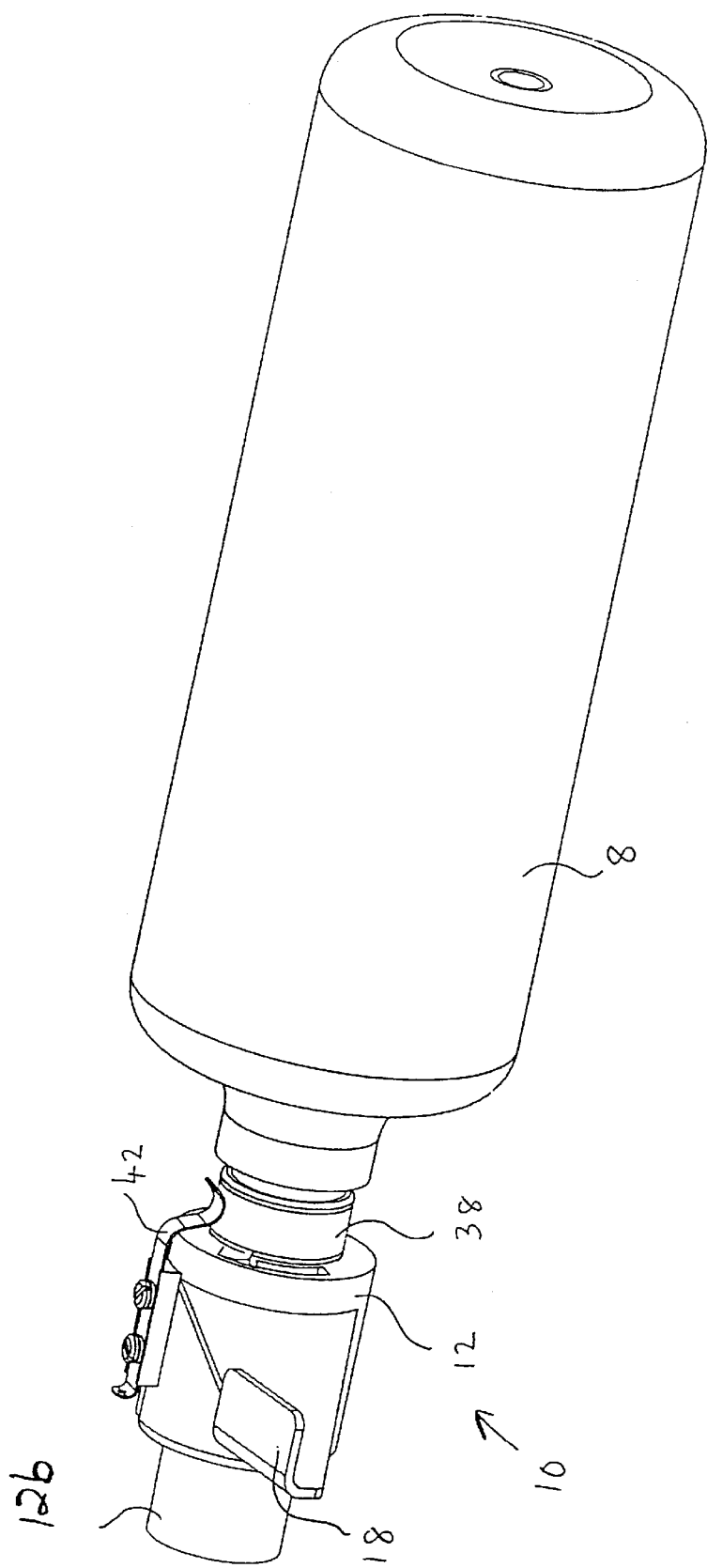

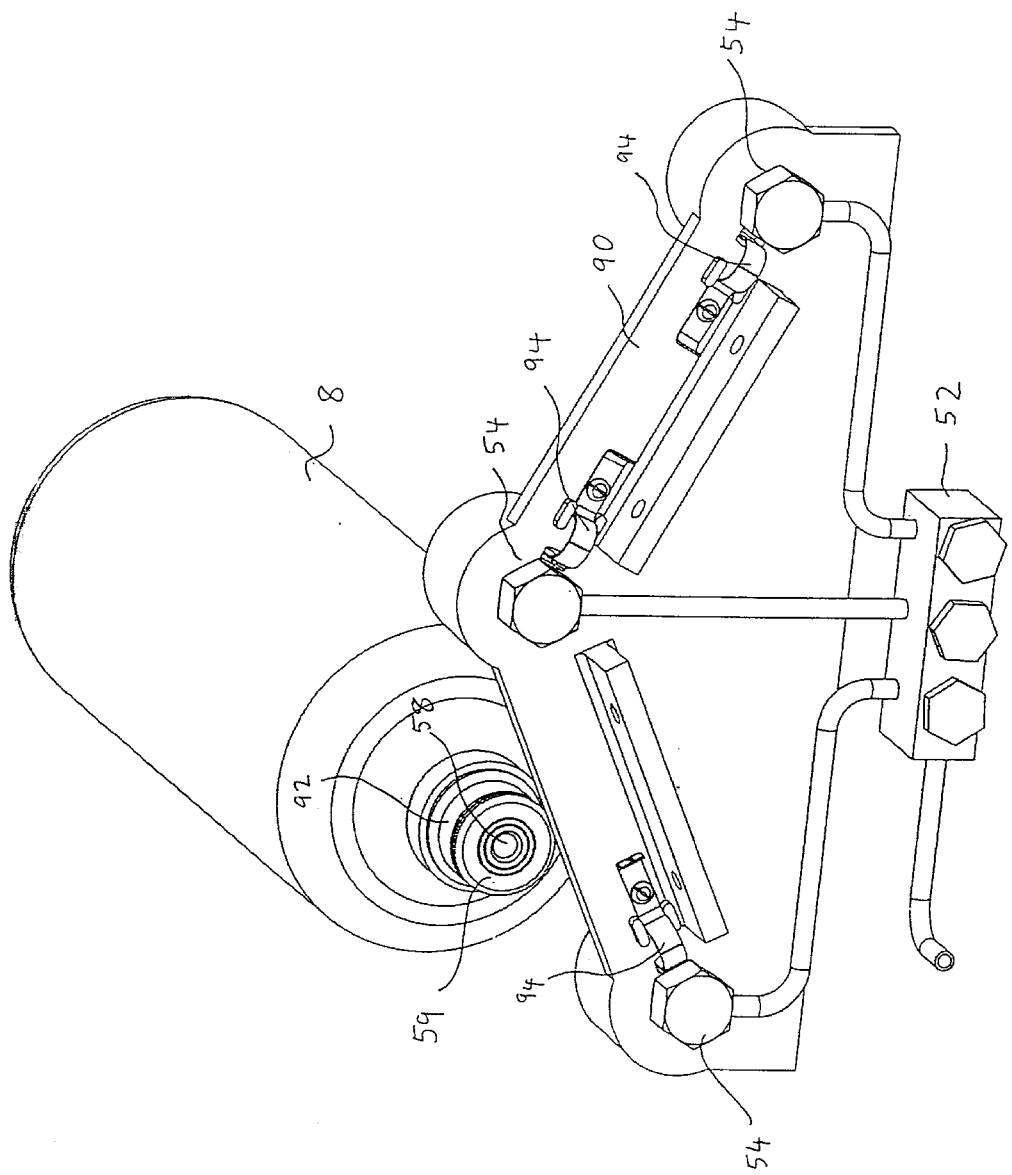

COUPLING MECHANISM AND VALVE SYSTEM FOR A PRESSURIZED FLUID CONTAINER

FIELD OF THE INVENTION

This invention relates to a valve system for a pressurized fluid container, such as a bottle or tank containing hydrogen gas under pressure. It also relates to a container incorporating the valve system and a connection system for connecting one or more of the containers to a gas intake port, such as a gas intake manifold of a fuel cell system.

BACKGROUND OF THE INVENTION

Hydrogen is typically stored as a compressed gas in a suitable container which is pressurized and equipped with an external valve to turn the supply of gas from the container on and off.

In order to facilitate connection of the container to, say, a gas intake manifold of a fuel cell system, so-called quick coupling mechanisms or quick connectors may be considered. One such quick connector comprises mutually engaging (bayonet type coupling) male and female members to provide a gas tight seal when engaged. Typically, the male member is provided on the container and the female member is provided on the manifold or more specifically, a support rail of the manifold. When in the engaged position, gas can flow from the container through the manifold and into the system for which it is required.

The disadvantage of this arrangement is that, if a connector has a slow leak, the contents of the container will leak away, even if the system is not in operation. Apart from resulting in the wastage of fuel, the accumulation of a gas such as hydrogen in air produces a combustible mixture which can result in an explosion if exposed to a spark or other ignition means.

SUMMARY OF THE INVENTION

According to the invention there is provided a quick connect fitting for a pressure fluid container, the fitting comprising a solenoid-activated valve for controlling outflow of fluid from a pressure fluid container, the valve having a valve body defining a chamber therein and means for connecting the valve body to a pressure fluid container with the chamber in communication with the interior of the pressure fluid container, and further comprising a valve opening in the chamber for permitting the outflow of fluid from the container through an external fluid outlet on the valve body which external fluid outlet is in communication with the valve opening, a solenoid and an armature for activation by the solenoid, a reciprocal valve stem provided with a valve seal for closing the valve opening to the flow of fluid therethrough, the stem being connected to the armature for movement of the stem to open the valve opening when electrical power is supplied to the solenoid, and wherein the solenoid has a first terminal which is connected to an electrical conductor located on the exterior of the valve body and electrically insulated from the valve body and a second terminal which is in electrical communication with the valve body for grounding the solenoid to a pressure container to which it is connected.

The valve body may be provided with a coupling member for connecting the external fluid outlet on the valve body to a fluid intake port of a consumer system to which the fluid is to be supplied, the coupling member being for engagement with a mating coupling member on the intake port.

The electrical conductor on the exterior of the valve body may be arranged for contact with an electrical conductor on the intake port upon engagement of the coupling member with the mating coupling member on the intake port.

The fitting may further comprise a coupling mechanism for connecting the external fluid outlet on the valve body to the fluid intake port of a consumer system to which fluid is to be supplied, wherein the coupling mechanism comprises first and second mutually engaging coupling members, the first coupling member being located on the valve body and the second coupling member being located on the fluid intake port. The intake port may be one of a plurality of inlet ports on a manifold for receiving a plurality of the containers.

According to another aspect of the invention there is provided a quick connect fitting for a pressure fluid container, the fitting comprising a solenoid-activated valve for controlling outflow of fluid from a pressure fluid container, the valve having a valve body defining a chamber therein and means for connecting the valve body to a pressure fluid container with the chamber in communication with the interior of the pressure fluid container, and further comprising a valve opening in the chamber for permitting the outflow of fluid from the container through an external fluid outlet on the valve body which external fluid outlet is in communication with the valve opening, a solenoid and an armature for activation by the solenoid, a reciprocal valve stem provided with a valve seal for closing the valve opening to the flow of fluid therethrough, the stem being connected to the armature for movement of the stem to open the valve opening when electrical power is supplied to the solenoid, and further comprising a coupling mechanism for connecting the external fluid outlet on the valve body to a fluid intake port of a consumer system to which fluid is to be supplied, wherein the coupling mechanism comprises first and second mutually engaging coupling members, the first coupling member being located on the valve body and the second coupling member being located on the fluid intake port and wherein the solenoid-activated valve is located upstream of the coupling mechanism.

According to a further aspect of the invention there is provided a container for storing a fluid under pressure, including a solenoid-activated valve for controlling outflow of fluid from the container, the valve comprising a chamber which is in communication with the interior of the container, a valve opening in the chamber for permitting the outflow of fluid from the container through an external fluid outlet on the container which is in communication with the valve opening, a solenoid and an armature for activation by the solenoid, a reciprocal valve stem provided with a valve seal for closing the valve opening to the flow of fluid therethrough, the stem being connected to the armature for movement of the stem to open the valve opening when electrical power is supplied to the solenoid, wherein the solenoid has a first terminal which is connected to an electrical conductor located on the exterior of the container and electrically insulated therefrom, and a second terminal which is in electrical communication with the container.

According to another aspect of the invention there is provided a container for storing a fluid under pressure, including a solenoid-activated valve for controlling outflow of fluid from the container, the valve comprising a chamber which is in communication with the interior of the container, a valve opening in the chamber for permitting the outflow of fluid from the container through an external fluid outlet on the container which is in communication with the valve opening, a solenoid and an armature for activation by the solenoid, a reciprocal valve stem provided with a valve seal for closing the valve opening to the flow of fluid therethrough, the stem being connected to the armature for movement of the stem to open the valve opening when electrical power is supplied to the solenoid, and further comprising a coupling mechanism for connecting the external fluid outlet on the container to a fluid intake port of a consumer system to which fluid is to be supplied, wherein the coupling mechanism comprises first and second mutually engaging coupling members, the first coupling member being located on the container and the second coupling member being located on the fluid intake port and wherein the solenoid activated valve is located upstream of the coupling mechanism.

Further objects and advantages of the invention will become apparent from the description of preferred embodiments of the invention below.

BRIEF DESCRIPTION OF THE DRAWINGS

FIG. 3 is a view similar to FIG. 1 but showing an exploded view of a valve mechanism of the pressurized gas container.

FIG. 4 is a cross-sectional view on a larger scale showing more detail of the valve of FIG. 3.

FIG. 5 is another perspective view of a pressurized gas container showing detail of an electrical contact mechanism for powering the valve mechanism.

FIG. 6a is a perspective view showing an alternative method of connecting a pressurized gas container to a gas intake manifold.

FIG. 6b is a perspective view in the opposite direction to that of FIG. 6a.

FIG. 6c is a cross-sectional view of a quick connect fitting for the pressurized gas container of FIG. 6a.

DETAILED DESCRIPTION OF PREFERRED EMBODIMENTS

Figure 1:
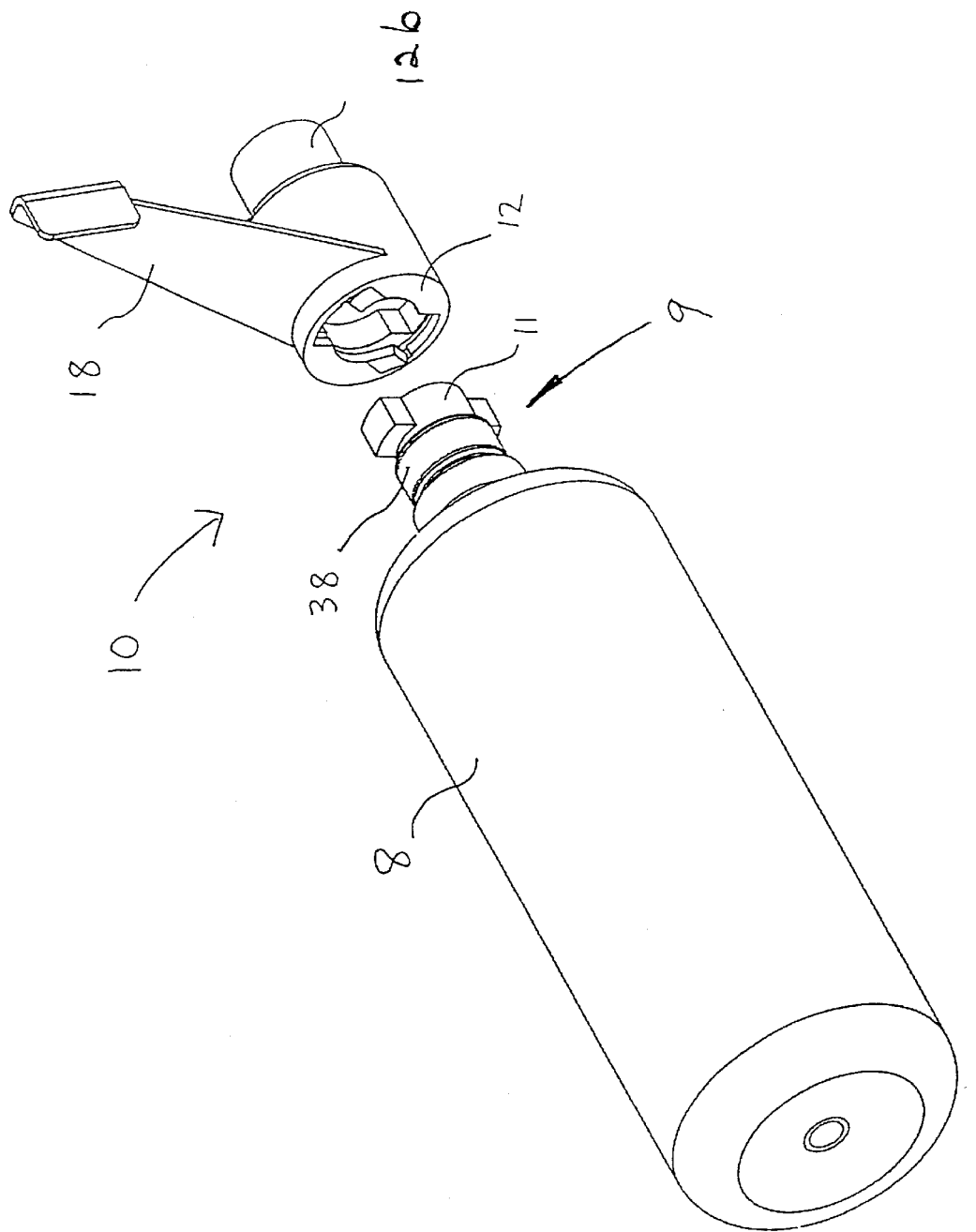
FIG. 1 is a perspective view of a pressurized gas container and shows a quick connector which is in an unengaged position.
Figure 2:
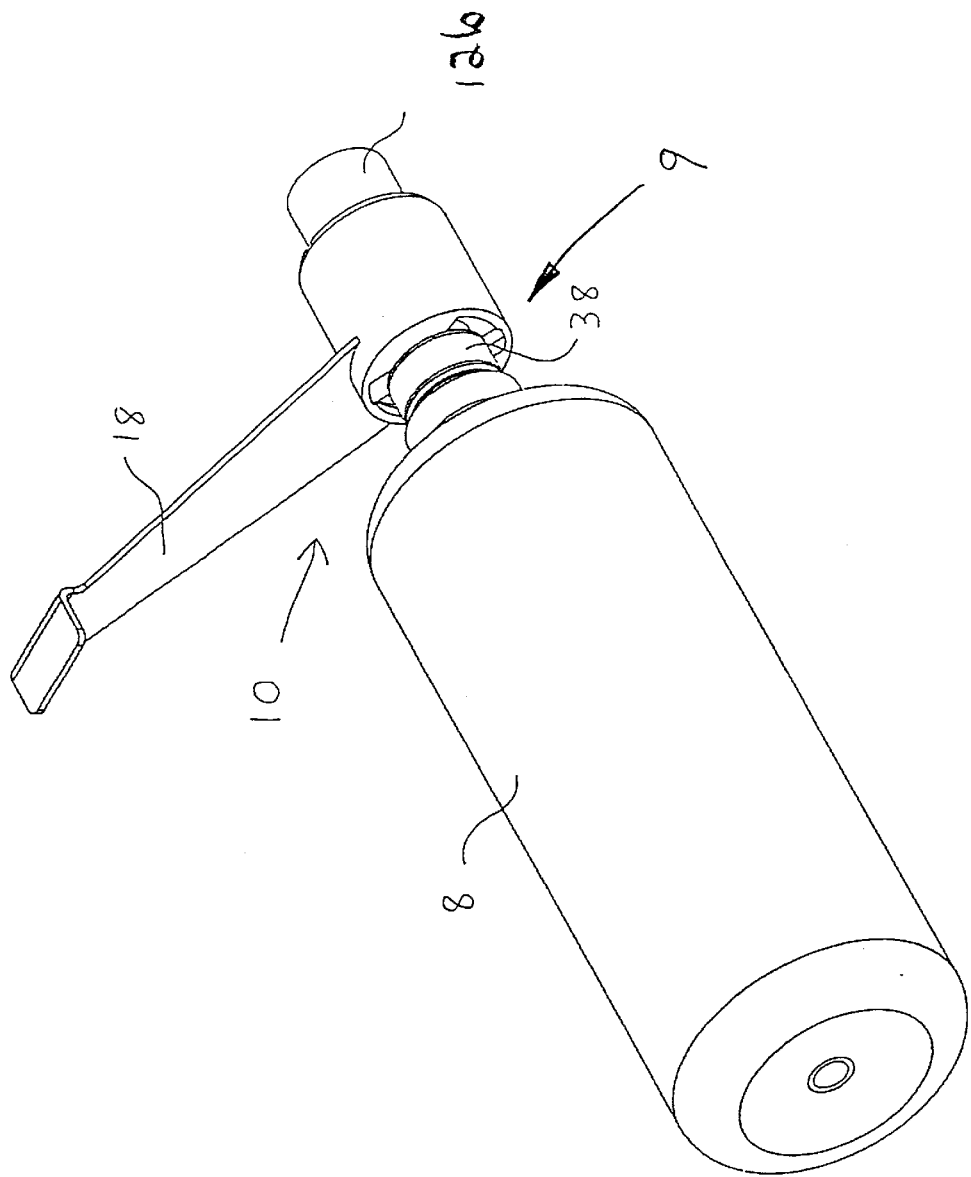
FIG. 2 is a view similar to FIG. 1 but showing the quick connector in an engaged position.

Referring to FIGS. 1 and 2, reference numeral 8 indicates a pressurized hydrogen gas container provided with a quick connect fitting 9. Reference numeral 10 generally indicates a quick connector for coupling the fitting 9 to a gas intake manifold 52 (FIG. 6a), only a coupling 12b to the manifold 52 being shown in FIGS. 1 and 2. Container 8 contains a metal hydride adsorbent such that hydrogen can be stored therein at pressures closer to atmospheric.

The quick connector 10 comprises a male member 11, provided on the fitting 9, and a female member 12, which is mounted on a supporting rail (not shown in FIGS. 1 and 2) of the manifold 52. As can be seen, the male and female members 11, 12 are provided with mutually engaging formations which can be locked together in bayonet fashion by relative rotation of the members 11, 12. In the present example, the female member 12 is rotatable about a longitudinal axis which corresponds with the longitudinal axis of the container 8 when the members 11, 12 are aligned for mutual engagement. The female member 12 is provided with a locking arm 18 for facilitating rotation of the member 12.

The fitting 9 comprises a valve 20 which is upstream of the quick connector 10, as shown in FIGS. 3 and 4. The valve 20 has a body 22 of aluminum, brass or other suitable conductive material which is screwed into the opening of the container 8. The body 22 has an inner chamber 24 which is in communication with the inside of the container 8. The chamber 24 is provided with a valve opening 26 through which gas can be discharged from the container 8.

The valve 20 further has a valve stem 28 with a seal 30 at one end thereof. As can be seen, the stem 28 extends through the valve opening 26 so that the seal 30 co-operates with the opening 26 for opening and closing the valve 20 to gas flow.

The stem 28 extends through the centre of a solenoid or coil 32 and an armature 34 is located on the other end of the stem 28. The stem 28 is biased to a closed position (i.e. in which the seal 30 is seated on the opening 26) by means of a spring 36 which is coiled around the stem 28. Therefore, the valve 20 is automatically in the closed position when no electrical power is provided to the coil 32. When power is provided, the magnetic field generated by the coil 32 attracts the armature 34, thereby opening the valve 20.

Provision for an electrical connection to the coil 32 is by means of an electrically conductive slip ring 38 provided around the outside of the valve body 22 and insulated therefrom by insulating sleeve 39. An electrical wire connection 40 extends between the slip ring 38 and one end of the coil 32. The other end of the coil 32 is grounded to body 22 and hence to container 8 which is also metallic and conductive.

The external opening of body 22 is covered with body plug 41. Body plug 41 has a central opening containing porous sintered filter 45 through which hydrogen gas can flow out from container 8. O-ring 43 provides a gas tight seal between body plug 41 and body 22. Body plug 41 also has an o-ring groove 47 formed on its outside face to locate and provide a sealing surface for an o-ring seal in female member 12 of quick connector 10. The outside face presented by body plug 41 and filter 45 is therefore almost flat. Thus, any debris or contaminants on this outside face can be readily cleaned off before connecting container 8 to manifold 14 (e.g. in the event that a disengaged container 8 was dropped in sand or the like).

Female member 12 comprises a rotatable outer latch body 12a and fixed inner coupling 12b. On the face of the fixed inner coupling is o-ring 12c which mates with o-ring groove 47 on body plug 41. Internal spring 12d is provided between latch body 12a and inner coupling 12b. Internal spring 12d provides the force to sealingly engage inner coupling 12b to body plug 41 when quick connector 10 is engaged.

As shown in FIG. 5, a contact finger 42 of an electrically conductive material is provided on the female member 12 of the quick connector 10 to provide an electrical connection with the slip ring 38.

The finger 42 is electrically insulated from the member 12, which latter member is of a suitable conductive material, such as copper or brass. As can be seen, the one end of the finger 42 is shaped so that it is in contact with the slip ring 38 when the quick connector 10 is engaged. In the present example, a positive charge of 12 V is applied to the coil 32 through the slip ring 38 while the coil 32 is grounded to the container 8, through the body 22 of the fitting 9.

Figure 6B:
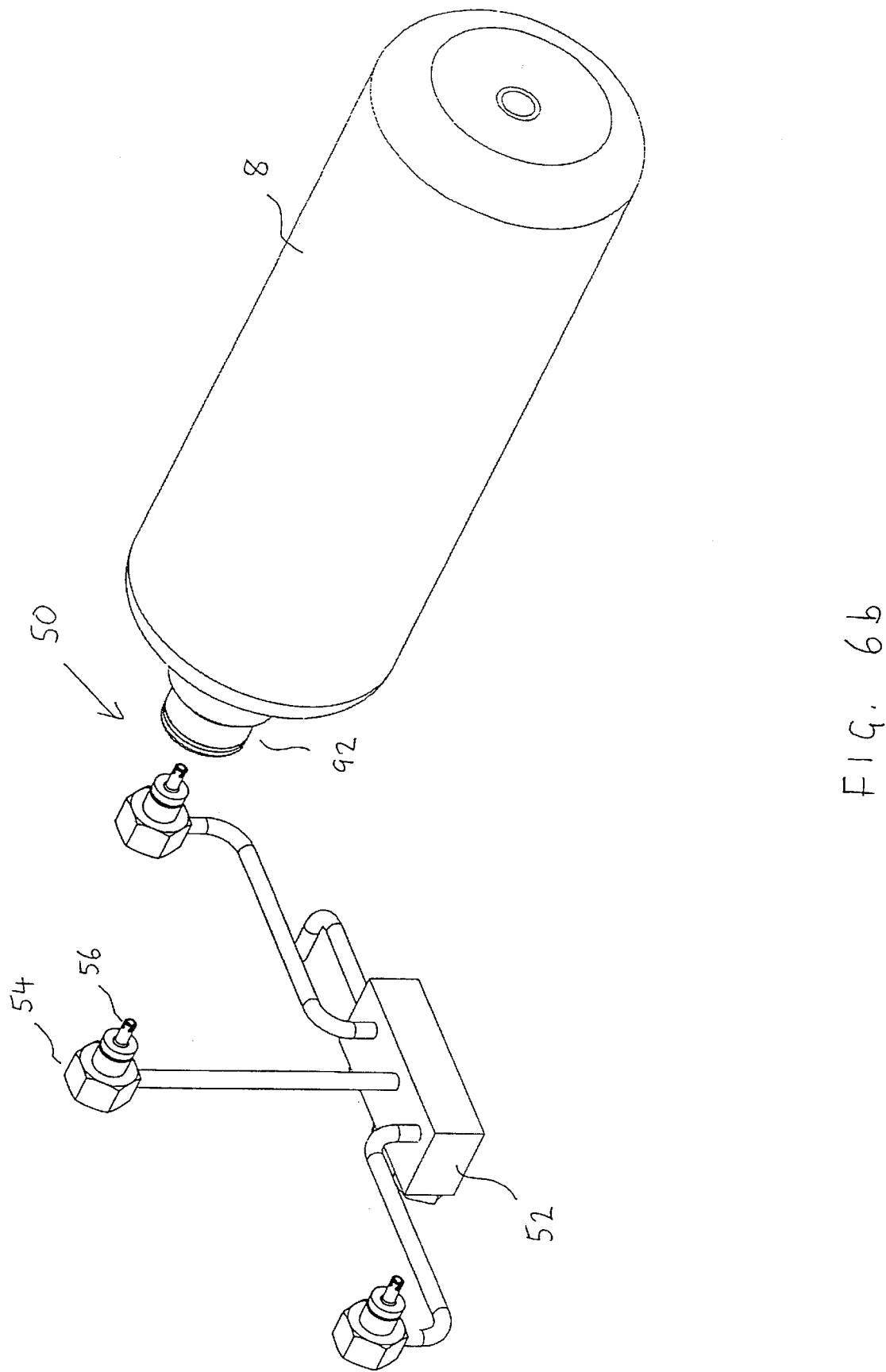

In the embodiment shown in FIGS. 6a, b, and c, a pin type connection 50 is shown as an alternative to the quick connector 10 of FIGS. 1 to 5. FIG. 6a shows a perspective view of a manifold 52 and plastic frame 90 which is provided with three connectors 54, each of which can be coupled to a container 8. Each connector has a tubular projection 56 (not visible in FIG. 6a) for engaging with an opening 58 provided on container fitting 92. Container 8 is held in position against connector 54 and frame 90 by any suitable means, such as a cam (not shown) which presses against the bottom of container 8. In this example electrical contact is through an annular conductor 59 surrounding the opening 58. A mating electrical contact finger 94 feeds through frame 90 to contact annular conductor 59. FIG. 6b shows an opposite perspective view to that of FIG. 6b illustrating projections 56. (Frame 90 is not shown in FIG. 6b for clarity).

Figure 6C:
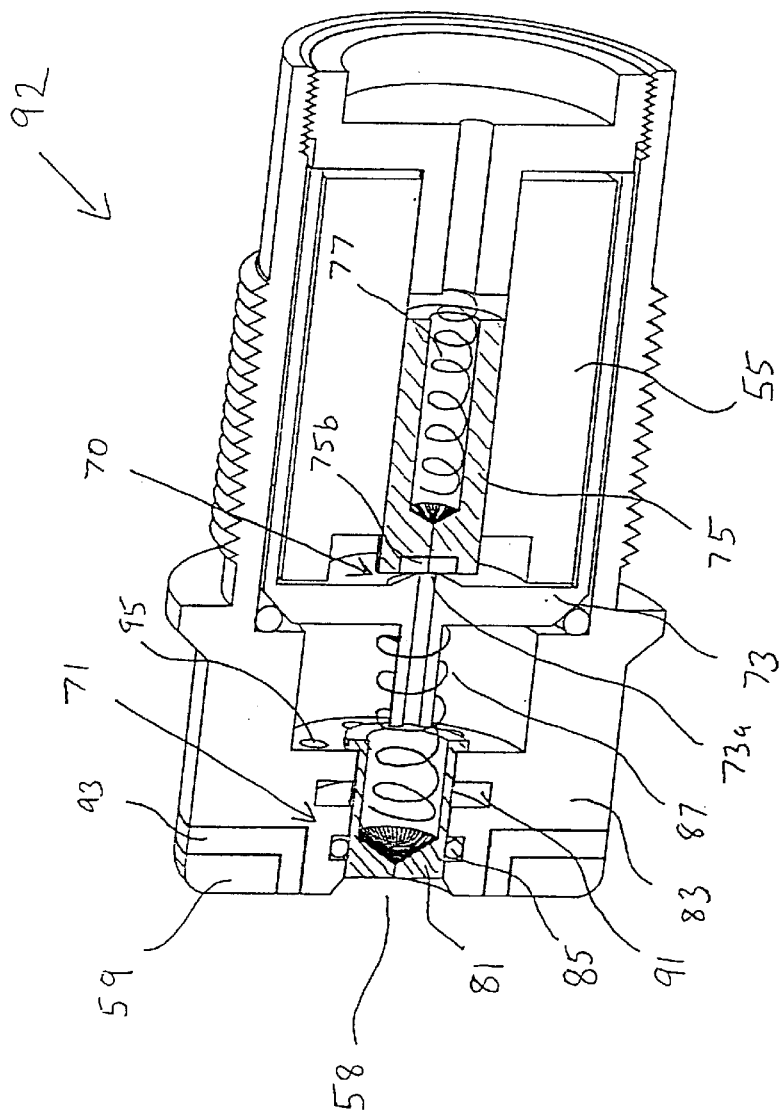

A cross-sectional view of fitting 92 is shown in FIG. 6c. In the embodiment of FIGS. 6a to c, two valves in series are provided in fitting 92: an electrically operated solenoid valve 70 and a mechanically operated quick connect valve 71. Solenoid valve 70 comprises body 73, coil 55, and armature 75. When no power is provided to coil 55, armature 75 comprising seal 75b is biased towards body 73 by way of spring 77 thereby sealing opening 73a, in body 73. When coil 55 is energized, armature 75 is directed away from opening 73a allowing hydrogen fuel to pass through. Quick connect valve 71 is located downstream of solenoid valve 70 and is actuated by the insertion of projection 56 of connector 54. Quick connect valve 71 comprises piston 81, fitting body 83, and o-ring seal 85. When container 8 is not coupled to connector 54, spring 87 biases piston 81 to a stop such that it engages o-ring 85 thereby sealing opening 58. However, when container 8 is coupled to connector 54, piston 81 is displaced away from o-ring seal 85 by projection 56 such that is clears chamber 91. This allows for the flow of fuel from opening 73a, through holes 95 into chamber 91, and then out through opening 58. Fuel therefore cannot escape from container 8 without the simultaneous actuation of both solenoid valve 70 and quick connect valve 71.

As with the embodiment shown in FIGS. 1–5, the outside face presented by fitting 92 is essentially flat and is thus relatively easy to keep free of debris. Electrical connections are made to solenoid coil 55 in a similar manner. In FIGS. 6a to c, an electrical connection is made to annular conductor 55 which is insulated from fitting body 83 by insulator 93 and is connected to coil 55 by way of a wire (not shown). Coil 55 is grounded through metal fitting body 83 and container 8. Preferably, a sintered filter (not shown) is also employed at the inside surface of fitting 92.

Figure 7:
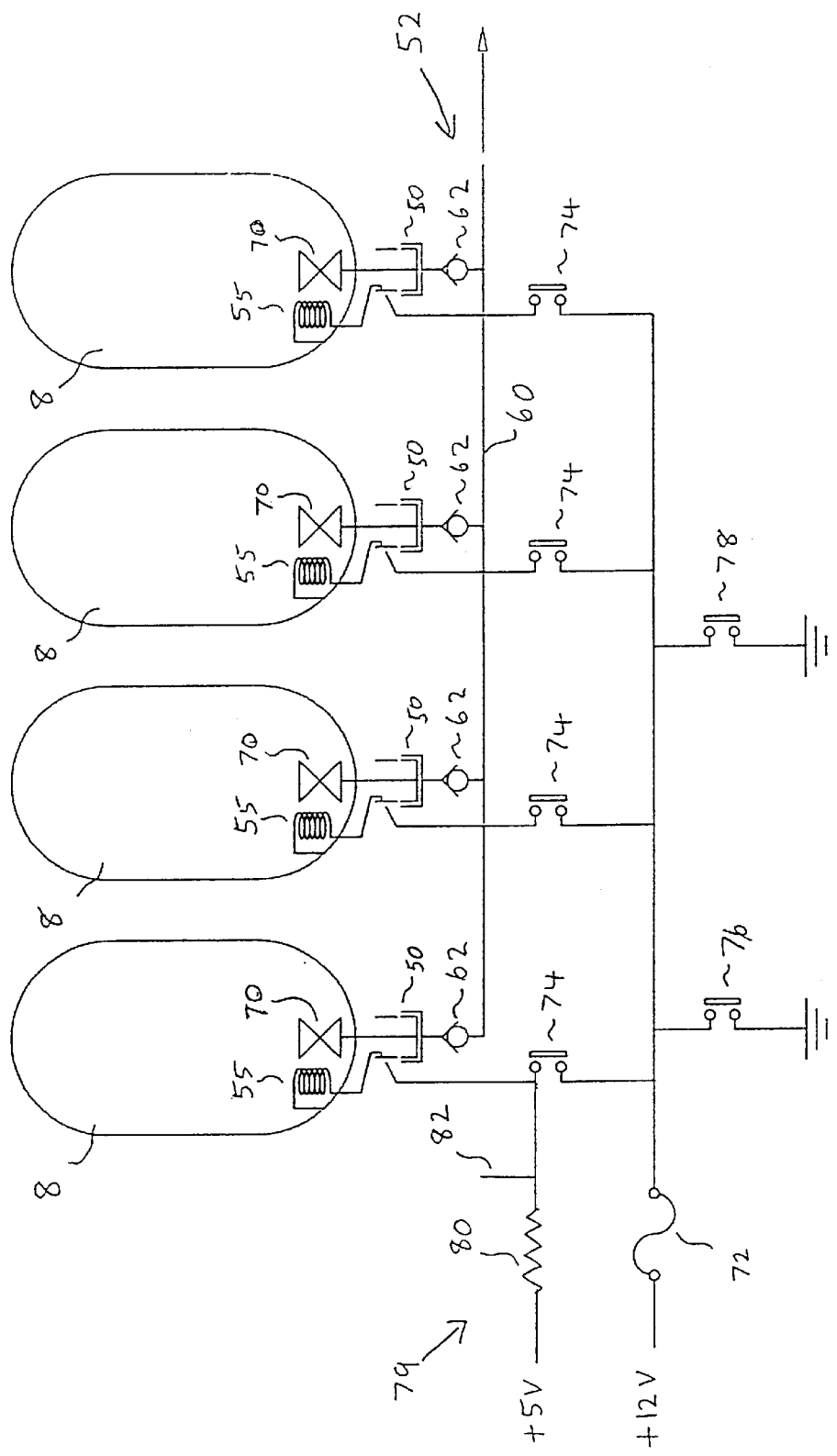
FIG. 7 is a diagrammatical illustration showing a connection system for a plurality of pressurized gas containers to a gas intake manifold.

With reference to FIG. 7, a system whereby one or more pressurized gas containers 8 are coupled to a gas intake manifold 52 is shown. FIG. 7 is a diagrammatical illustration and the parts corresponding with the parts shown in FIGS. 6a, b, and c are given like reference numerals. The manifold 52 has a support rail which is indicated by reference numeral 60. Reference numeral 62 indicates one-way (check) valves which are built into the manifold 52 to prevent the backflow of gas.

Four containers 8 are shown connected by quick connectors 50 to the manifold rail 60. Each container 8 has a fitting containing a solenoid valve 70 described above with reference to FIG. 6c. In the present example, the valve coil or solenoid 55 has a resistance of 70 Ω.

As shown, +12 V is applied to the system through a fuse 72. A control relay 74 is provided for each quick connector 50. The circuit includes a relay 76 which closes when a hydrogen gas leak is sensed by a hydrogen gas sensor (not shown) and a thermoswitch 78 which closes when a high enclosure temperature is sensed. If either one of the relay 76 or thermoswitch 78 closes, a high current flows through to ground which blows the fuse 72, thereby shutting off electrical power. This results in all the valves 70 automatically closing.

The presence or absence of a container 8 at each position on rail 60 may be detected using a simple sensing circuit. This information may then be used by a control system to estimate how much hydrogen is available for power generation (by number of containers present) and whether or not to energize a particular control relay 74. For instance, a simple sensing circuit is illustrated at one position on rail 60 in FIG. 7. In sensing circuit 79, a +5 V supply is connected via resistor 80 to the downstream side of control relay 74. Sense wire 82 is also connected to the downstream side of control relay 74. Resistor 80 is selected such that it has a much greater resistance than solenoid valve coil 55 (for instance, resistor 80 is 10 kΩ and coil 55 is about 70 Ω). Before energizing any solenoid valves 50, +5 V will be detected by the sense wire if a container is absent. However, if a container is present, the +5 V supply voltage will drop mainly across resistor 80 and sense wire 82 will detect close to zero volts instead.

While only preferred embodiments of the invention have been described herein in detail, the invention is not limited thereby and modifications can be made within the scope of the attached claims.

What is claimed is:

1. A quick connect fitting for a pressurized fluid container, the fitting comprising a solenoid-activated valve for controlling outflow of fluid from the container, the valve having a valve body defining a chamber therein and a connector for connecting the valve body to the container such that the chamber fluidly communicates with the interior of the container, the fitting further comprising:

a valve opening in the chamber for permitting the outflow of fluid from the container through an external fluid outlet on the valve body, the external fluid outlet fluidly communicating with the valve opening, a solenoid and an armature for actuation by the solenoid, a reciprocal valve stem having a valve seal for closing the valve opening to the flow of fluid therethrough, the stem being connected to the armature for movement of the stem to open the valve opening when electrical power is supplied to the solenoid, wherein the solenoid has a first terminal connected to an electrical conductor located on the exterior of the valve body and electrically insulated from the valve body and a second terminal in electrical communication with the valve body for grounding the solenoid to a pressure container to which it is connected;

wherein the valve body is provided with a coupling member for connecting the external fluid outlet on the valve body to a fluid intake port of a consumer system to which the fluid is to be supplied, said coupling member engaging a mating coupling member on the intake port; and wherein the electrical conductor on the exterior of the valve body contacts an electrical conductor on the intake port upon engagement of the coupling member with the mating coupling member on the intake port.

2. A quick connect fitting for a pressurized fluid container, the fitting comprising a solenoid-activated valve for controlling outflow of fluid from the container, the valve having a valve body defining a chamber therein and a connector for connecting the valve body to the container such that the chamber fluidly communicates with the interior of the container, the fitting further comprising:

a valve opening in the chamber for permitting the outflow of fluid from the container through an external fluid outlet on the valve body, the external fluid outlet fluidly communicating with the valve opening, a solenoid and an armature for actuation by the solenoid, a reciprocal valve stem having a valve seal for closing the valve opening to the flow of fluid therethrough, the stem being connected to the armature for movement of the stem to open the valve opening when electrical power is supplied to the solenoid, wherein the solenoid has a first terminal connected to an electrical conductor located on the exterior of the valve body and electrically insulated from the valve body and a second terminal in electrical communication with the valve body for grounding the solenoid to a pressure container to which it is connected;

wherein the valve body is provided with a coupling member for connecting the external fluid outlet on the valve body to a fluid intake port of a consumer system to which the fluid is to be supplied, said coupling member engaging a mating coupling member on the intake port; and wherein the coupling member has an exterior surface, facing away from the valve body, which is substantially flat.

3. A quick connect fitting for a pressurized fluid container, the fitting comprising a solenoid-activated valve for controlling outflow of fluid from the container, the valve having a valve body defining a chamber therein and a connector for connecting the valve body to the container such that the chamber fluidly communicates with the interior of the container, the fitting further comprising:

a valve opening in the chamber for permitting the outflow of fluid from the container through an external fluid outlet on the valve body, the external fluid outlet fluidly communicating with the valve opening, a solenoid and an armature for actuation by the solenoid, a reciprocal valve stem having a valve seal for closing the valve opening to the flow of fluid therethrough, the stem being connected to the armature for movement of the stem to open the valve opening when electrical power is supplied to the solenoid, wherein the solenoid has a first terminal connected to an electrical conductor located on the exterior of the valve body and electrically insulated from the valve body and a second terminal in electrical communication with the valve body for grounding the solenoid to a pressure container to which it is connected;

wherein the electrical conductor on the exterior of the valve body comprises an annular member surrounding the external fluid outlet on the valve body.

4. A connection system comprising a pressurized fluid container and a quick connect fitting connected to the container, the fitting comprising a solenoid-activated valve for controlling outflow of fluid from the container, the valve having a valve body defining a chamber therein and a connector for connecting the valve body to the container such that the chamber fluidly communicates with the interior of the container, the fitting further comprising:

a valve opening in the chamber for permitting the outflow of fluid from the container through an external fluid outlet on the valve body, the external fluid outlet fluidly communicating with the valve opening, a solenoid and an armature for actuation by the solenoid, a reciprocal valve stem having a valve seal for closing the valve opening to the flow of fluid therethrough, the stem being connected to the armature for movement of the stem to open the valve opening when electrical power is supplied to the solenoid, wherein the solenoid has a first terminal connected to an electrical conductor located on the exterior of the valve body and electrically insulated from the valve body and a second terminal in electrical communication with the valve body for grounding the solenoid to a pressure container to which it is connected; and a coupling mechanism for connecting the external fluid outlet on the valve body to a fluid intake port of a consumer system to which fluid is to be supplied, wherein the coupling mechanism comprises first and second mutually engaging coupling members, the first coupling member being located on the valve body and the second coupling member being located on the fluid intake port;

wherein the solenoid has a predetermined resistance, and further comprising means for electrically sensing the presence or absence of the resistance of the solenoid, thereby determining the presence or absence of a container at the intake port of the consumer system.

5. The connection system according to claim 4, wherein the intake port is one of a plurality of inlet ports on a manifold for receiving a plurality of the containers.

6. The connection system according to claim 4, wherein the consumer system is a fuel cell.

7. The connection system according to claim 4, wherein the container is a pressure container for hydrogen gas.

8. A quick connect fitting for a pressurized fluid container, the fitting comprising a solenoid-activated valve for controlling outflow of fluid from the container, the valve having a valve body defining a chamber therein and a connector for connecting the valve body to the container such that the chamber fluidly communicates with the interior of the container, and further comprising:

a valve opening in the chamber for permitting the outflow of fluid from the container through an external fluid outlet on the valve body which external fluid outlet is in communication with the valve opening, a solenoid and an armature for activation by the solenoid, a reciprocal valve stem provided with a valve seal for closing the valve opening to the flow of fluid therethrough, the stem being connected to the armature for movement of the stem to open the valve opening when electrical power is supplied to the solenoid, and further comprising a coupling mechanism for connecting the external fluid outlet on the valve body to a fluid intake port of a consumer system to which fluid is to be supplied, wherein the coupling mechanism comprises first and second mutually engaging coupling members, the first coupling member being located on the valve body and the second coupling member being located on the fluid intake port and wherein the solenoid activated valve is located upstream of the coupling mechanism;

wherein the valve body is of an electrically conductive material and the solenoid has a first terminal which is connected to an electrical conductor located on the exterior of the valve body and electrically insulated therefrom, and a second terminal which is in electrical communication with the valve body for grounding the solenoid to a pressure container to which it is connected; and wherein the electrical conductor on the exterior of the valve body contacts an electrical conductor on the intake port upon engagement of the first coupling member with the second coupling member.

9. The fitting according to claim 8, wherein the electrical conductor on the exterior of the valve body comprises an annular member surrounding the external fluid outlet on the valve body.

* * * * *